Aug. 10, 1948.    F. R. HAMER    2,446,828
AUXILIARY DOOR LOCKING MECHANISM FOR AUTOMOBILES
Filed Aug. 12, 1947    2 Sheets-Sheet 1

INVENTOR
FRANCIS R. HAMER

ATTORNEYS

Aug. 10, 1948.　　　　F. R. HAMER　　　　2,446,828
AUXILIARY DOOR LOCKING MECHANISM FOR AUTOMOBILES
Filed Aug. 12, 1947　　　　　　　　　　2 Sheets—Sheet 2
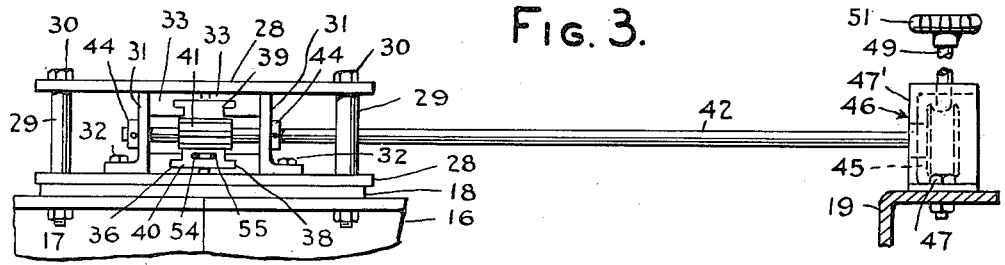
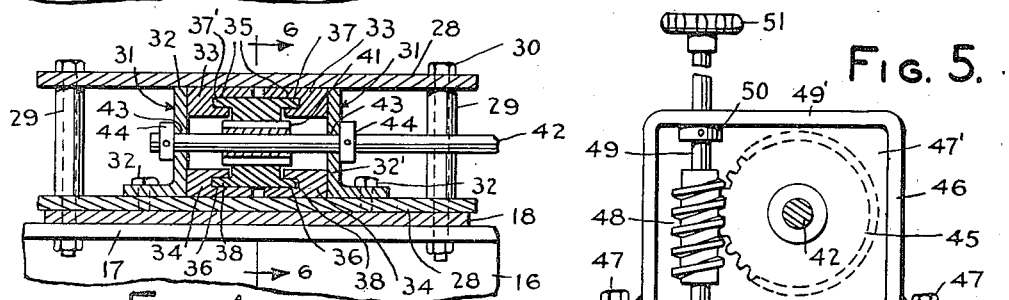
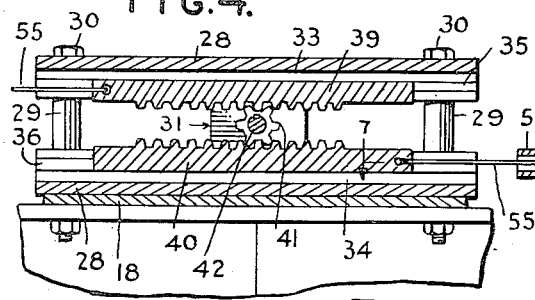
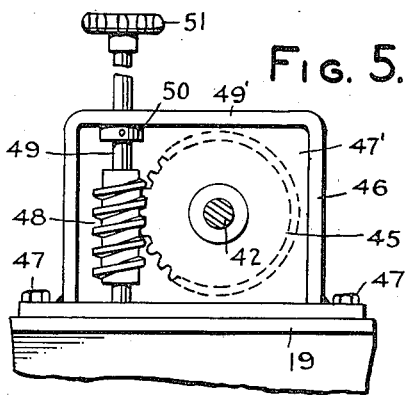
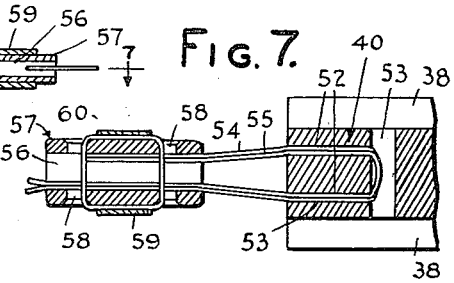
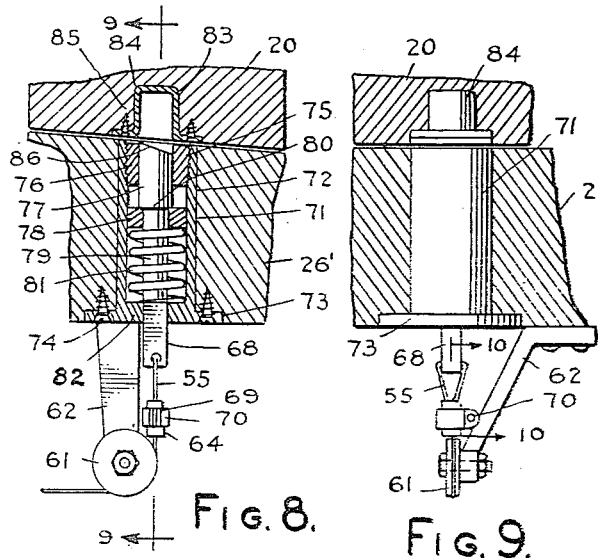
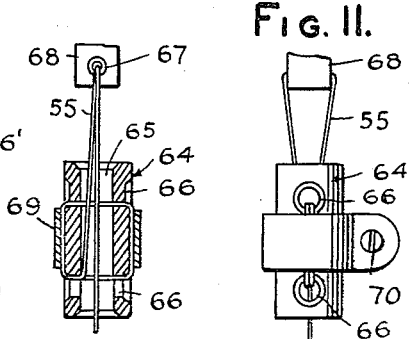
INVENTOR
FRANCIS R. HAMER
ATTORNEYS Patented Aug. 10, 1948

2,446,828

UNITED STATES PATENT OFFICE 2,446,828

AUXILIARY DOOR LOCKING MECHANISM FOR AUTOMOBILES

Francis R. Hamer, West Asheville, N. C.

Application August 12, 1947, Serial No. 768,125

4 Claims. (Cl. 292—38)

My invention relates to an auxiliary door locking mechanism for automobiles.

An important object of the invention is to provide auxiliary means for locking and unlocking all of the doors of a conventional automobile simultaneously, such means being remotely controlled by the driver.

A further object is to provide remote control auxiliary locking means for the doors of automobiles, so that such doors cannot be opened by passengers or children while the car is in motion, and can be opened only after being unlocked by the driver.

A further object is to provide an auxiliary door locking mechanism adapted for installation upon any conventional make of automobile.

A still further object is to provide an auxiliary door locking mechanism which is simple in design, durable, fool proof, and quite inexpensive to manufacture.

Other objects and advantages of the invention will be apparent during the course of the following description.

Figure 1:
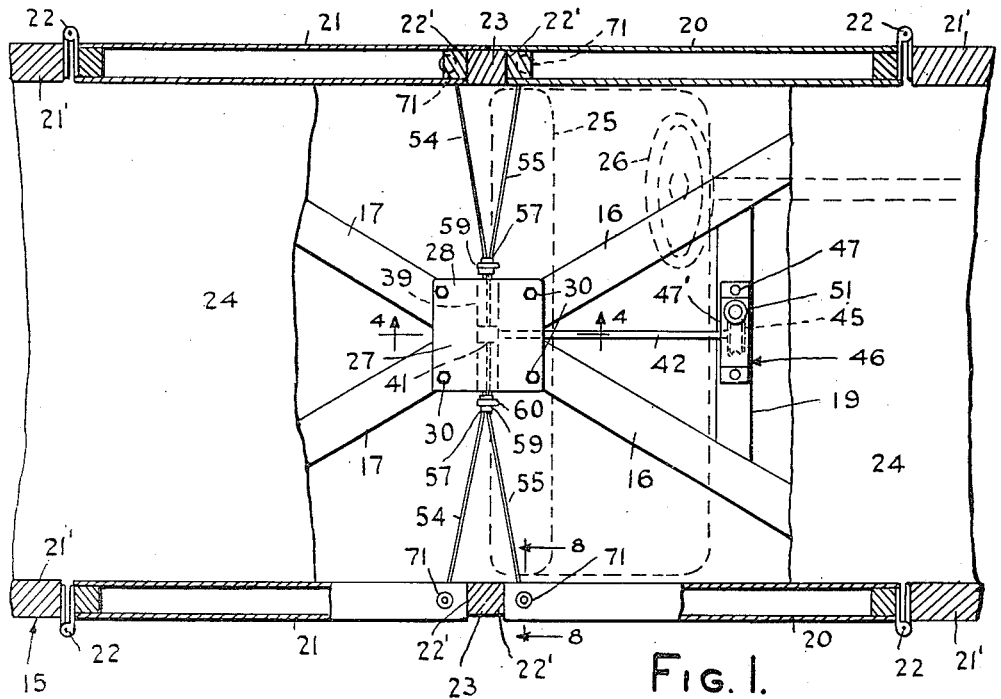
Figure 2:
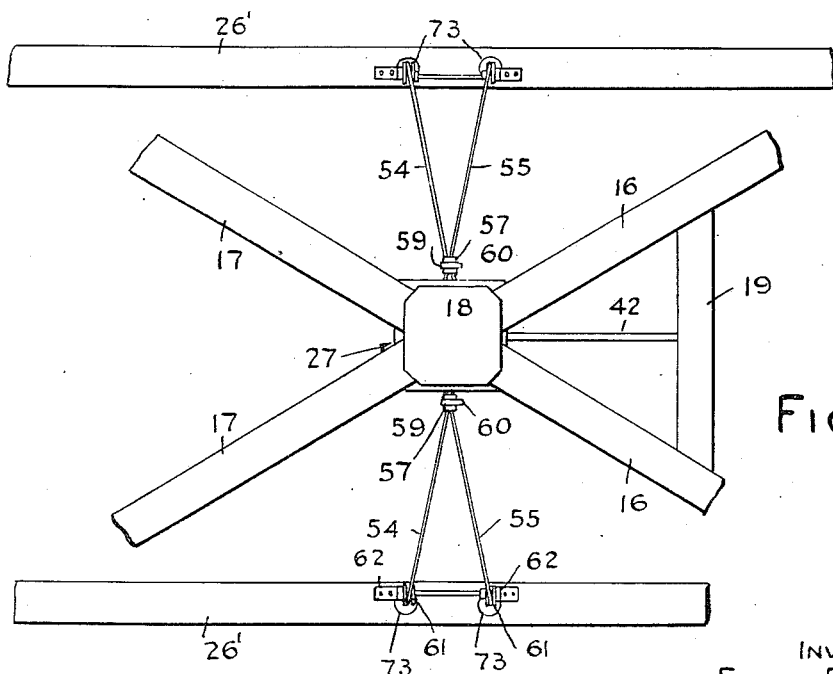

In the accompanying drawings forming a part of this application and in which like numerals are employed to designate like parts throughout the same, Figure 1 is a fragmentary plan view of a conventional four door automobile showing the auxiliary door locking mechanism applied thereto, parts broken away and parts in section, Figure 2 is a fragmentary bottom plan view of the same, Figure 3 is a side elevation of the auxiliary door locking mechanism as applied to the frame of an automobile, parts in section, and parts broken away, Figure 4 is an enlarged fragmentary vertical section taken on line 4—4 of Figure 1, parts omitted, Figure 5 is an end elevation of the door locking mechanism showing remote control operating means, parts omitted, Figure 6 is a vertical section taken on line 6—6 of Figure 4, Figure 7 is a fragmentary horizontal section taken on line 7—7 of Figure 6, Figure 8 is a fragmentary vertical section through one of the auxiliary door locking bolts and associated elements, parts broken away, taken on line 8—8 of Figure 1, Figure 9 is a vertical section taken on line 9—9 of Figure 8, parts in elevation, Figure 10 is an enlarged fragmentary vertical section taken on line 10—10 of Figure 9, parts omitted, and, Figure 11 is a fragmentary side elevation of an auxiliary locking bolt and wire fitting.

In the drawings where for the purpose of illustration is shown a preferred embodiment of my invention, the numeral 15 designates a conventional four door automobile, having the usual horizontal X-frame, comprising forward and rear pairs of horizontal converging members 16 and 17, rigidly connected at their inner converged ends, by means of welding, or the like. Upper and lower flat horizontal plates 18 are provided, and these plates are welded to the top and bottom of the X-frame at the junction of the members 16 and 17. The numeral 19 designates a transverse horizontal member or beam, rigidly secured at its opposite ends to the members 16 of the X-frame, and disposed between the same, forwardly of the plates 18. The X-frame and the beam 19 form an integral horizontal frame or chassis. The numerals 20 and 21 designate front and rear pairs of doors respectively, hinged at their outer edges to the vertical body structure 21' of the automobile in the usual manner as shown at 22. The pairs of doors 20 and 21 swing horizontally, and their inner opposed edges are disposed adjacent to and upon opposite sides of vertical posts or members 23 when the doors are closed, Figure 1. The posts 23 constitute part of the body structure of the automobile. The numeral 24 designates the usual sheet metal floor of the automobile body, partly broken away in Figure 1 to show the X-frame and associated elements. The numeral 25 designates the outline of the front seat of the automobile, showing its position relative to the doors thereof and steering wheel 26. The numeral 26' designates the concealed running boards of the automobile. The running boards 26' constitute an integral part of the body structure, and are disposed directly beneath the lower edges of the doors 20 and 21 when they are closed, Figures 8 and 9.

Rigidly mounted upon the upper plate 18 of the X-frame is a horizontally disposed relatively flat rack gear box or support 27, including upper and lower flat horizontal plates 28. The plates 28 are spaced vertically by means of tubular spacers 29 receiving corner mounting bolts 30. These bolts 30 pass through both plates 28, spacers 29, top plate 18, and the top horizontal webs of the X-frame members 16 and 17. The bolts 30 serve to rigidly mount the rack gear box 27 upon the X-frame. Disposed between the spaced plates 28 of the box 27 are spaced parallel angle members 31, and these angle members 31 are arranged at right angles to the longitudinal center line of the automobile. The angle members 31 are rigidly attached to the lower plate 28 by means of screws 32, or the like. Rigidly mounted upon the inner sides of the opposed vertical webs 32' of the angle members 31 are pairs of upper and lower guides 33 and 34, having pairs of parallel horizontal rectangular grooves 35 and 36 formed therein. These pairs of grooves 35 and 36 slidably receive longitudinal side flanges 37 and 38 of upper and lower rack gears 39 and 40. The rack gears 39 and 40 are disposed at right angles to the longitudinal center line of the automobile and are free to slide longitudinally of the guides 33 and 34. Arranged between the upper and lower rack gears 39 and 40 is a pinion gear 41, rigidly mounted upon a horizontal rotatable shaft 42, and in meshed engagement with the teeth of the upper and lower rack gears. The rotatable shaft 42 is journaled in openings 43 in the vertical webs of the angle members 31, and the shaft is held against end movement by means of collars 44 rigidly mounted thereon. The shaft 42 is disposed at the longitudinal center line of the automobile and is parallel thereto, and extends forwardly from the rack box 27 and terminates near the forward edge of the front seat 25. Rigidly mounted upon the shaft 42 at its forward end is a worm gear 45, disposed within an upstanding rectangular housing or support 46, rigidly mounted upon the beam 19 at the longitudinal center of the same by means of bolts 47, or the like.

The support 46 has a rear vertical web 47' having an opening for receiving the forward end of the shaft 42 which is journaled therein. The numeral 48 designates a worm adjacent to the worm gear 45 and in meshed engagement therewith. The worm 48 has its axis disposed vertically, and at right angles to the axis of the worm gear 45. This worm 48 is rigidly mounted upon a vertical rotatable shaft 49, journaled in openings in the top 49' and base of the support 46. The shaft 49 is held against upward end movement by means of a collar or washer 50, rigidly mounted thereon, and disposed beneath the top 49'. The lower end of the shaft 49 engages upon the top of the beam 19. The shaft 49 projects upwardly through the floor 24 of the automobile adjacent to the forward edge of the front seat 25, Figure 1, and the upper end of the shaft 49 is provided with a knob or handle 51, rigidly mounted thereon. This knob or handle is spaced above the floor of the automobile and is in convenient reach of the driver, who turns it to operate the auxiliary door locking mechanism.

The opposite outer ends of the upper and lower rack gears 39 and 40 are each provided with a longitudinal pair of spaced parallel openings 52, intersecting a transverse opening 53, formed near each outer end. Each opening 53 is arranged at right angles to the openings 52, Figure 7. Two strands 54 and 55 of flexible wire or cable are looped through the openings 52 and 53 of the upper and lower rack gears, as shown at Figure 7. These strands of wire 54 and 55 form loops within the ends of the rack gears, and the ends of each loop extend outwardly from the ends of the rack gears, Figure 7. One end of each loop formed by the wire strands 54 and 55 extends longitudinally through a central opening 56 in a cylindrical wire holder or sleeve 57, disposed adjacent to the outer end of each rack gear. Each fitting 57 is provided with longitudinally spaced parallel transverse openings 58, which receive the strands 54 and 55 of the opposite end of the loop formed thereby. This end of the wire loop enters the opening 56 and is passed through the openings 58 the desired number of times, in the manner shown in Figure 7. The numeral 59 designates a split cylindrical clip, surrounding the outside diameter of the sleeve 57, and engaging over the strands 54 and 55 to rigidly clamp the same to the fitting 57. Each split clip 59 is provided with a screw 60 to provide the clamping action. The ends of the strands 54 and 55 which pass directly through the opening 56 of each fitting 57 diverge, Figures 1 and 2. These strands 54 and 55 extend transversely of the X-frame, and each pair of diverging strands 54 and 55 engages over a pair of longitudinally spaced pulleys 61, rotatably mounted upon depending brackets 62, in turn rigidly mounted upon the bottom surface of the adjacent concealed running board 26', Figures 2 and 9. The pairs of pulleys 61 upon opposite sides of the automobile are in transverse alignment, and are spaced longitudinally upon opposite sides of the vertical posts 23 of the body structure, Figure 1. Each of the strands 54 and 55 passes over its associated pulley 61, and is received in a sleeve 64, identical to the sleeve 57. Each sleeve 64 is cylindrical, and provided with central longitudinal opening or passage 65, and longitudinally spaced transverse openings 66, arranged at right angles to the passage 65 and intersecting the same. Each strand 54 and 55 passes directly through the opening 65 in the associated sleeve 64, and is passed through a small transverse opening 67 formed in the lower end of an adjacent vertically movable latch bolt 68. The strand of wire passed through the opening 67 of each bolt is looped back upon itself and reenters the opening 65 of the sleeve 64. The end of the strand is passed through the transverse openings 66 the desired number of times, as shown in Figure 10. A split clamp 69 identical to the clamp 59 surrounds the fitting 64 and engages over the wire looped through the openings 66. The clamp 69 is held in tight clamping engagement upon the strand of wire by means of a clamp 70.

Each of the four auxiliary locking bolts 68 is disposed within a vertical cylindrical sleeve 71, rigidly mounted within a recess 72 formed in the concealed running board 26'. Each sleeve 71 has a lower circular flange 73 having openings to receive screws 74, or the like, rigidly attaching the sleeve 71 to the running board. The top of each sleeve 71 terminates flush with the top surface of the running board 26', and does not project above the same. The inside diameter of the sleeve 71 is screw threaded near its top end, for receiving an externally screw threaded guide bushing 75 having a central vertical opening 76, to slidably receive the upper cylindrical end 77 of the bolt 68. Slidably mounted within the sleeve 71 is a washer 78, surrounding the reduced square shank 79 of the bolt 68, and engaging against the shoulder 80 formed by the end 77. A coil compression spring 81 is disposed within the sleeve 71 and this spring surrounds the square shank 79. One end of this compression spring engages against the bottom surface of the washer 78, to force the bolt 68 upwardly, while its opposite end is seated upon the bottom 82 of the sleeve 71. It is thus seen that each bolt 68 is biased upwardly by each spring 81. The square shank 79 of each bolt 68 projects downwardly through a square opening 82' formed in the bottom 82 of each sleeve 71. Each bolt is therefore positively held against turning. The lower horizontal edge of each of the automobile doors 20 and 21 is close to the top of the adjacent running board 26' when the door is closed, Figure 8. Formed in the bottom edge of each door 20 and 21 adjacent to each sleeve 71, and in axial alignment therewith, is a recess 83 for receiving a cylindrical latch socket 84, rigidly mounted therein by means of screws 85 or the like. This socket 84 receives the end 77 of the adjacent bolt 68, when the same is in the elevated or locking position. Each locking bolt 68 has its top end beveled or inclined as at 86, and the bottom edge of each door 20 and 21 inclined downwardly and toward the outer side of the door, Figure 8. This arrangement is such that when the bolt 68 is in the uppermost or locking position, the uppermost point on its inclined top 86 is slightly below the uppermost point on the inclined bottom of the adjacent door.

In operation, when it is desired to lock all four doors of the automobile simultaneously, so that they cannot be opened while the car is in motion, or otherwise, the driver turns the knob 51 in the counter-clockwise direction, Figure 1. This causes the worm 48 to rotate, driving the worm gear 45, driving the shaft 42 which carries the pinion 41. This pinion 41 rotates counter-clockwise, Figure 6, and the upper and lower rack gears 39 and 40 move outwardly laterally from the box 27 in opposite directions. When this occurs the diverging strands 54 and 55, Figure 1, will move outwardly laterally of the X-frame, and the springs 81 acting upon the bolts 68 force the same upwardly and into the sockets 84 of the doors 20 and 21. This action locks the doors. The bolts 68 cannot disengage from within the sockets 84 until the driver turns the knob 51 in the clockwise direction, Figure 1. When this is done the worm 48 revolves in the opposite direction, driving the worm gear 45, driving the pinion 41. The rack gears 39 and 40 then move inwardly to their positions in Figure 6, and the bolts 68 are simultaneously withdrawn from within the sockets 84. The doors of the automobile may then be opened.

If the doors of the car are opened and the bolts 68 happen to be arranged in their upper or locking positions, and the doors are then slammed shut, the same will automatically become locked by the bolts 68. When this occurs the lower inclined edge of the door will engage the upper beveled or inclined surface of the associated bolt 68 and cause the bolt to retract downwardly, against the force of the spring 81, and then snap upwardly and into the socket 84, when the door is completely closed. No damage can be done by slamming the doors while the bolts 68 are in the elevated position.

It should be noted that the springs 81 are heavy springs and exert a considerable upward force upon each bolt 68. Notwithstanding this fact, when the bolts have been moved to their lower or non-locking positions, the springs cannot move the bolts upwardly until the knob 51 has been turned by the driver. This is true because the worm gear 45 is incapable of driving the worm 48, and can only be driven by the worm.

This locking mechanism is designed to be used in conjunction with the conventional automobile door locking means, and its use does not necessitate materially changing the standard structure of the car in any way.

It is to be understood that the form of my invention herewith shown and described is to be taken as a preferred example of the same and that various changes in the shape, size, and arrangement of parts may be resorted to, without departing from the spirit of my invention or the scope of the subjoined claims.

Having thus described my invention, what I claim is:

1. An auxiliary door locking mechanism for automobiles of the type having a chassis, a body including front and rear pairs of doors, running boards adjacent to the lower edges of said doors, door posts adjacent to the inner edges of the doors, a floor, and a forward seat, said mechanism comprising a support mounted upon the chassis adjacent to the door posts and disposed beneath the floor, rack gears slidably mounted upon the support and adapted to slide longitudinally in opposite directions and transversely of the chassis, a pinion disposed between the rack gears and meshing therewith to drive the same, a rotatable shaft carrying the pinion and projecting forwardly from the support and terminating near the forward seat, manually operated means disposed adjacent to the forward seat for rotating the shaft, flexible elements connected with opposite ends of the rack gears and extending outwardly beyond the same and laterally of the chassis, guide means mounted upon the body near the door posts and adapted to receive the flexible elements thereon, movable bolts mounted upon the running boards adjacent to the guide means and connected with the flexible elements, and resilient means associated with each bolt and tending to force the same into engagement with the adjacent door for locking the same, the arrangement being such that when the rotatable shaft is turned in one direction, the bolts move into locking engagement with the doors and when such shaft is turned in the opposite direction the bolts move out of locking engagement with the doors.

2. An auxiliary door locking mechanism for automobiles of the type having a chassis, a body including front and rear pairs of doors, running boards adjacent to the lower edges of said doors, door posts adjacent to the inner edges of the doors, a floor, and a forward seat, said mechanism comprising a support mounted upon the chassis adjacent to the door posts and disposed beneath the floor, rack gears slidably mounted upon the support and adapted to slide longitudinally in opposite directions and transversely of the chassis, a pinion disposed between the rack gears and meshing therewith to drive the same, a rotatable shaft carrying the pinion and projecting forwardly of the support and terminating near the forward seat, a worm gear mounted upon the rotatable shaft for driving the shaft and disposed adjacent to the forward seat, a substantially vertical rotatable shaft disposed adjacent to the forward seat and projecting above the floor, a worm mounted upon the substantially vertical shaft for rotation therewith and adapted to drive the worm gear, means to turn the substantially vertical shaft, flexible elements connected with opposite ends of the rack gears and extending outwardly beyond the same and laterally of the chassis, guide means mounted upon the running boards near the door posts and adapted to receive the flexible elements thereon, movable bolts mounted upon the running boards adjacent to the guide means and connected with the flexible elements, and resilient means associated with each bolt to force the same into engagement with the adjacent door for locking the same, the arrangement being such that when the rotatable shaft is turned in one direction the resilient means move the bolts into locking engagement with the doors and when such shaft is turned in the opposite direction the bolts are pulled out of locking engagement therewith.

3. An auxiliary door locking mechanism for automobiles of the type having a chassis, a body including front and rear pairs of doors, running boards adjacent to the lower edges of said doors, door posts adjacent to the inner edges of the doors, a floor, and a forward seat, said mechanism comprising a support mounted upon the chassis near the door posts and disposed beneath the floor, rack gears slidably mounted upon the support and adapted to slide longitudinally in opposite directions and transversely of the chassis, a pinion disposed between the rack gears and meshing therewith to drive the same, a rotatable shaft carrying the pinion and projecting forwardly of the support and terminating near the forward seat, manually operated means adjacent to the forward seat for rotating the shaft, flexible elements connected with opposite ends of the rack gears and extending outwardly beyond the same and laterally of the chassis, pulleys arranged near the door posts and adapted to receive the flexible elements thereon, brackets for rotatably supporting the pulleys and mounted upon the running boards, vertically disposed bolts mounted upon the running boards adjacent to the pulleys and connected with the flexible elements and adapted to move vertically, coil springs surrounding each bolt and tending to force the same upwardly vertically, and sockets mounted within the lower edges of the doors adjacent to the bolts for receiving the upper ends of the bolts when the same are in the elevated locking position.

4. An auxiliary door locking mechanism for automobiles of the type having a chassis, a body including front and rear pairs of doors, running boards adjacent to the lower edges of said doors, door posts adjacent to the inner edges of the doors, a floor, and a forward seat, said mechanism comprising a support mounted upon the chassis adjacent to the door posts and disposed beneath the floor, rack gears slidably mounted upon the support and adapted to slide longitudinally in opposite directions and transversely of the chassis, a pinion disposed between the rack gears and meshing therewith to drive the same, a rotatable shaft carrying the pinion and projecting forwardly of the support and terminating near the forward seat, a worm gear mounted upon the rotatable shaft for driving the same and disposed adjacent to the forward seat, a substantially vertical rotatable shaft disposed adjacent to the forward seat and extending above the floor, a worm mounted upon the substantially vertical shaft for rotation therewith and adapted to drive the worm gear, vertically disposed bolts mounted upon the running boards near the door posts and adapted to move vertically, coil springs surrounding each bolt and tending to bias the same upwardly into engagement with the adjacent doors for locking the same, and movable elements connected with opposite ends of the rack gears and connected with the bolts for moving the same, the arrangement being such that the worm and worm gear serve as locking means to positively position the bolts in the selected adjusted positions by overcoming the force exerted on the bolts by the coil springs.

FRANCIS R. HAMER.

REFERENCES CITED

The following references are of record in the file of this patent:

UNITED STATES PATENTS

| Number | Name | Date |
|---|---|---|
| 1,662,985 | Signore | Mar. 20, 1928 |
| 2,066,705 | Vazquez | Jan. 5, 1937 |
| 2,077,135 | Walker | Apr. 13, 1937 |
| 2,101,035 | Mistretta | Dec. 7, 1937 |